(No Model.)
J. W. MULLEN.
TESTING MACHINE.
No. 358,056. Patented Feb. 22, 1887.
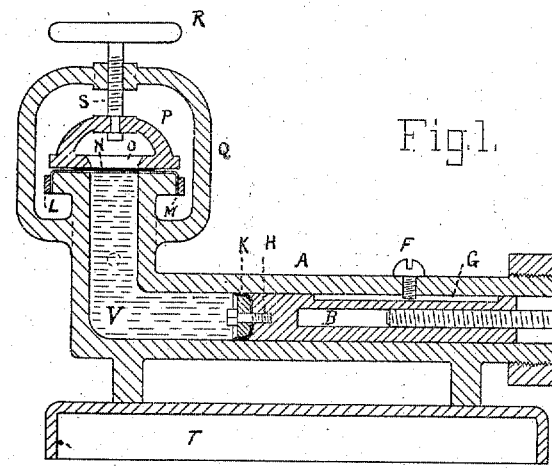
Fig.1.
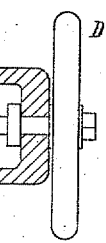
Fig.3.
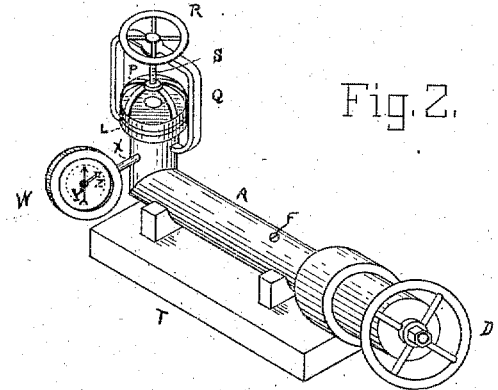
Fig.2.
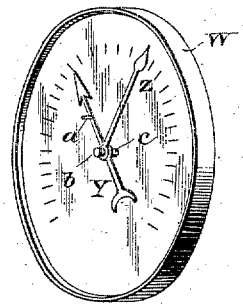
Witnesses
Chas L. Robinson
A. L. Spooner
Inventor
John W. Mullen
By Hawes & Chapman
Attorneys.

UNITED STATES PATENT OFFICE.

...LLEN, OF HOLYOKE, MASSACHUSETTS.

TESTING-MACHINE.

SPECIFICATION forming part of Letters Patent No. 358,056, dated February 22, 1887.

Application filed August 9, 1886. Serial No. 210,395. (No model.)

*To all whom it may concern:*

Be it known that I, JOHN W. MULLEN, a citizen of the United States, residing at Holyoke, in the county of Hampden and Commonwealth of Massachusetts, have invented a new and useful Improvement in Testing-Machines, of which the following is a specification, reference being had to the accompanying drawings, forming part thereof.

My invention relates to machines for testing the tensile strength of fabrics, and more particularly to that class of such machines in which the test is made by pressure exerted against the fabric in a direction perpendicular to its surface.

Heretofore, so far as I am aware, machines for testing and registering the tensile strength of fabrics have belonged to one or the other of two types or general classes. The first and most numerous type is composed of those machines in which a strip of the fabric is clamped between two pairs of grips or holders, after which, by means of weights and scale-beams or manually-operated levers, one of the pairs of grips or holders is moved away from the other until the strip of fabric between them is fractured, the amount of force required to cause the fracture being registered by suitable apparatus. This type of machine has been found to be wholly unreliable as a means of determining the true strength of fabrics, particularly with respect to paper, owing to the fact that the strain being exerted in the direction of the plane of the fabric, and being distributed over or through a comparatively large area thereof, the stretching of the fabric interferes with the accurate registering of the force exerted at the instant of fracture, and, moreover, in the case of very thin papers, especially, the strain exerted in this manner causes a fracture to begin at the edge of the strip and tear toward the center thereof, such fracture being by no means a test of the actual tensile strength of the paper within the edges of the same. These objections have led to the construction of the second type of machines referred to—to wit, one in which the strain is exerted upon or against a limited area of the fabric within its edges and in a direction perpendicular to the surface thereof. So far as I am aware, this type is limited to one species of machine, in which the fabric is firmly clamped in such a position that it covers the open mouth or bore of a vertical tube, within which a metallic plunger is located in such manner that when elevated by a weight sliding upon a scale-beam, to which the plunger is connected, the plunger is brought in contact with the under side of the clamped fabric, and fractures the latter when the force exerted by the weight overcomes the tensile resistance of the same. This machine, while it overcomes many of the defects existing in those of the first type referred to, is itself open to very serious objections, among which may be mentioned the inability of the contacting end of the plunger to adapt itself to unevenness in the surface of the fabric, which becomes of vital importance when thin papers of delicate texture are to be tested, and the impossibility of determining the exact amount of pressure exerted by the plunger through the scale-beam and weight, owing to the unknown amount of friction between the beam and its fulcrum, and, again, between the beam and its connection with the plunger, and, still again, between the plunger and the interior of the bore in which it moves. Moreover, it is practically impossible to construct a scale-beam with a scale thereon graduated to a degree commensurate with the delicate operation of accurately registering the tensile strength of very light fragile papers.

The object of my invention is to overcome these defects in existing machines, and to construct one which tests the tensile strength of fabrics by a strain exerted upon a limited area, within the edges of the same, and at the same time accurately measures and registers the amount of strain at the instant of fracture, whether the fabric be of a tenacious character or the most delicate.

I have discovered that the actual strength of paper of any grade can be accurately determined by subjecting a single sheet thereof to the strain exerted by liquid under pressure, directed against a limited area of the surface, and that this strain can be accurately registered at the instant at which it overcomes the tenacity of the paper and ruptures the same, the strain exerted at this instant, measured in pounds and fractional parts thereof, being the exact tensile strength of the paper. I have embodied this principle in a machine which obviates all of the objections noted above as pertaining to existing machines, and which is at the same time compact in structure and comparatively inexpensive in manufacture.

My invention therefore consists in the method and apparatus hereinafter more fully described, and particularly specified in the claims.

In the drawings, in which like letters indicate like parts in all the figures, Figure 1 is a central longitudinal sectional view of my machine, showing the fabric clamped in position to be tested. Fig. 2 is a perspective view thereof, and Fig. 3 is a detail perspective view of parts hereinafter referred to.

A represents a cylinder, attached to and supported by the bed-plate or base T in any suitable manner. The cylinder A is centrally bored throughout its entire length, and is preferably bent near one of its ends at a right angle, as shown. Within the horizontal portion of the cylinder thus formed is inserted a piston, B, which is of slightly less diameter than the bore of the cylinder, so that a snug fit is insured, the piston, however, being adapted to be moved back and forth longitudinally of the bore. There are obviously many ways in which this reciprocation of the piston could be effected. I have shown what seem to me to be the best means for securing this result, which are as follows: The rear end of the piston is centrally bored for a portion of its length, said bore being provided with a screw-thread. Within this bore is entered a screw-threaded rod, C, which rod at its outer end is supported in such a manner that it is capable of turning without progression by a hollow cap, E, which cap is screwed upon the end of cylinder A. Connected with the end of said rod C, outside of the cap, is a hand-wheel, D, for convenience in turning the same. Within the periphery of piston B is cut a longitudinal groove, G, which groove receives the end of a screw, F, passing inwardly through the wall of cylinder A, the function of said screw being to prevent axial movement of the piston, while permitting it to reciprocate.

From the construction just described it follows that by turning the hand-wheel D in one direction a gradual and steady advance of the piston within the bore of the cylinder will be effected, and that by turning it in the reverse direction the piston will be caused to recede.

In order to secure a water and air tight connection between the piston and the bore of the cylinder, I provide the former at its inner forward end with a cup, K, made of leather or other suitable flexible material, and secure the same to the piston in a well-known manner by means of the screw H and washer, as shown.

The vertical portion of the cylinder terminates, preferably, in a peripheral flange, the outer face of which presents a flat smooth surface.

M indicates a diaphragm, preferably composed of a rubber disk, which must be of a greater diameter than the bore of the cylinder, it being designed to close the mouth of the bore when placed thereover, and for convenience of manipulation I have made it of greater diameter than the flanged end of the cylinder and have connected it with a ring, L, the ring having a diameter sufficient to allow it to be pressed down over the flange, as shown in Fig. 1, thus enabling the disk to be readily removed and replaced.

The paper to be tested (shown at N in the drawings) is placed upon the disk after the latter has been put in position over the mouth of the cylinder, and must be firmly clamped thereon. There are many forms of clamps which might be used for this purpose; but I prefer to employ the one shown in the drawings, which is constructed as follows:

Formed integral with or attached to the cylinder at any convenient point below the flange is a bracket, Q, extending upwardly and inwardly to a point over the center of the bore of the cylinder. This bracket may be composed of two arms, as shown, or of a single arm. Mounted in a screw-threaded socket in said bracket is the screw-rod S, to which, for convenience in turning, is attached a hand-wheel, R. Swiveled to the lower end of said rod, by means of converging arms, is the clamp P, said clamp consisting of a disk the under side of which is flat and smooth, and having a central opening of the same diameter as the bore of the cylinder with which the opening registers. Rotation of the hand-wheel in one direction will raise the clamp from and in the reverse direction will lower it upon the flanged end of the cylinder, and, as is obvious, by continuing the rotation in the latter direction the clamp can be forced against the end of the cylinder to such a degree as with the rubber disk to form a water and air tight joint.

The construction thus far described comprises the means for directing a column of water under pressure against the surface of the paper to test its tensile strength.

It only remains for me to describe the means for measuring and registering the amount of strain required to rupture the paper. These means consist of a conducting-pipe, X, leading from the bore of the cylinder at any suitable point in the vertical portion thereof to a pressure-gage, W, located in any convenient position. I have shown the pipe as being short and straight and as supporting the gage at its outer end; but this arrangement may be varied at will. The gage may be of any of the well-known constructions in which pressure of water is indicated by the pointer on the dial in pounds and fractional parts thereof. I have, however, added to such a gage a feature which I believe to be new with me, which is shown more clearly in Fig. 3, the same consisting of an indicator, Z, having a frictional bearing upon the axis c of the pointer Y to such an extent that said indicator will have no movement except when positively moved in one direction by the pointer, which may have a projecting lug, a, for that purpose, and in the reverse direction by manual manipulation, said indicator having the milled head b for this purpose. The result of this construction is that when the pointer is moved around the dial by the pressure of the water it carries with it the indicator, the point of the latter registering with the point of the former. When, however, the pressure ruptures the paper and the pointer makes the sudden retrograde movement resulting from the sudden release of the pressure, the indicator remains stationary at the point at which the rupture occurred, thus registering the exact strength of the paper until moved back, for another test.

The operation of my machine will be apparent from the foregoing description. That portion of the bore of the cylinder in front of the piston is filled with water, and the ring L is forced around the end of the cylinder, causing the rubber disk to closely cover the mouth of the bore and confine the water therein. A single sheet of the paper to be tested is then placed upon the disk and the clamp P is lowered and forced down upon the paper and disk until a water-tight joint is formed. The hand-wheel D is then turned, forcing the piston forward, compressing the water until the pressure of the latter exerted against the paper through the elasticity of the rubber disk is sufficient to rupture the paper, the gage-indicator registering the exact amount of pressure existing at the instant of rupture, as hereinbefore described. The rubber disk, while it permits the full pressure of the water to be communicated directly to the paper, prevents any escape of the water from the cylinder, and consequently no moisture is imparted to the paper.

While I have illustrated and described the use of water in my machine, and prefer such use, I wish it to be understood that various other liquids could be substituted therefor, or that air could be utilized in my machine without departing from the spirit of my invention. It is also obvious that fabrics other than paper could be successfully tested in my machine.

I claim—

1. The method of testing the tensile strength of fabrics herein set forth, the same consisting in subjecting a limited area of the fabric to a strain exerted by liquid under pressure through an interposed elastic diaphragm and registering the amount of such strain.

2. The method of testing the tensile strength of fabrics herein set forth, the same consisting in rigidly supporting a limited area of the fabric in a plane horizontal to a column of water under pressure, interposing between the fabric and adjacent end of the column of water an elastic water-proof medium, and subjecting the water to an increased pressure sufficient to rupture the fabric and simultaneously therewith indicating and registering the amount of pressure exerted.

3. In a machine for testing paper or other fabric, the combination of a hollow cylinder containing water, a piston, means for reciprocating the latter, and an elastic water-proof disk closing the open end of the cylinder, with means for clamping a sheet of paper upon said disk in such a manner that compression of the water by movement of the piston will cause the paper to be ruptured within its edges, and means for registering the amount of pressure exerted by the water, substantially as shown and described.

4. In a machine for testing the tensile strength of fabrics, a hollow cylinder containing liquid, a piston, means for reciprocating the latter, an elastic disk closing the open end of the cylinder to prevent direct contact of the liquid with the fabric, a clamp consisting of a disk having a central opening, said opening being of the diameter of the bore of the cylinder, and means for raising and lowering said clamp, all combined and arranged substantially as set forth.

5. In a machine for testing fabrics, the combination, with a hollow cylinder containing liquid, of an elastic disk closing one end of said cylinder, means for rigidly supporting a sheet of paper upon said disk, a pressure-gage, a conducting-pipe leading from the interior of the cylinder to said gage, and means for compressing the water within the cylinder, substantially as shown and described.

6. In a machine for testing fabrics, a hollow cylinder containing liquid, an elastic covering for one end of the cylinder, means for clamping the fabric over said covering, means for compressing the liquid within the cylinder, a conducting-pipe leading from the interior of the cylinder, a pressure-gage connected with the outer end of said pipe, said gage having a dial and pointer, an indicator mounted upon the axis of the pointer, and connecting means between said pointer and indicator adapted to move the latter in but one direction, all combined and operating substantially as shown and described.

7. The combination of cylinder A, piston B, means to reciprocate the latter, rubber disk M, bracket Q, screw-rod S, and clamp P, arranged and operating substantially as set forth.

8. The combination of cylinder A, piston B, disk M, ring L, clamp P, pipe X, and gage W, arranged and operating substantially as described.

9. The combination of cylinder A, piston

B, having the groove G, screw F, screw-rod C, cap E, hand-wheel D, disk M, clamp P, pipe X, gage W, pointer Y, and indicator Z, arranged and operating substantially as described.

10. The combination of cylinder A, piston B, having a water-tight packing at its front end, elastic water-proof disk M, clamp P, and means for raising and lowering said clamp, with means for measuring the pressure exerted against the disk by a column of water confined within the cylinder when the piston is advanced, substantially as shown and described.

JOHN W. MULLEN.

Witnesses:
W. H. CHAPMAN,
R. EMIL EZOLD.